United States Patent
Yamazaki et al.

(10) Patent No.: US 6,257,217 B1
(45) Date of Patent: Jul. 10, 2001

(54) COMBUSTION CHAMBER COMPONENT FOR AN INTERNAL COMBUSTION ENGINE HAVING A WATER AND OIL REPELLENT COATING AND PROCESS FOR FORMATION OF COATING

(75) Inventors: Hideharu Yamazaki; Katsuhiko Kohyama; Yoshihiro Kuki; Masaaki Hasegawa; Hiroyoshi Hayakawa, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/320,650

(22) Filed: May 27, 1999

(30) Foreign Application Priority Data

May 29, 1998 (JP) .................................................. 10-148608

(51) Int. Cl.[7] ............................. F02B 77/02; B32B 15/08; C09D 183/04
(52) U.S. Cl. ....................... 123/668; 123/668; 123/188.8; 123/188.3; 251/368; 428/447; 428/450; 427/307; 427/309; 427/385.5; 427/387; 427/388.1
(58) Field of Search .................... 123/668, 188.8, 123/188.3; 251/368; 427/388.1, 387, 307, 309, 385.5; 428/447, 450

(56) References Cited

U.S. PATENT DOCUMENTS

| | | | |
|---|---|---|---|
| 4,120,995 | * 10/1978 | Phipps et al. | 427/318 |
| 4,683,277 | * 7/1987 | Maxson | 528/21 |
| 5,707,740 | * 1/1998 | Goodwin | 428/421 |
| 6,090,447 | * 7/2000 | Suzuki et al. | 134/40 |

FOREIGN PATENT DOCUMENTS

| | | |
|---|---|---|
| 8-105352 | 10/1994 | (JP) . |
| 9-112392 | 10/1995 | (JP) . |
| 11116809 | * 4/1999 | (JP) . |

* cited by examiner

*Primary Examiner*—Harold Pyon
*Assistant Examiner*—Elena Tsoy
(74) *Attorney, Agent, or Firm*—Arent Fox Plotkin Kintner Kahn PLLC.

(57) ABSTRACT

A combustion chamber component for an internal combustion engine has a water and oil repellent coating which has good adhesive power and in which the effect of suppressing the accumulation of deposits is well maintained. The coating is formed from an organosilicon compound represented by the formula $Rf-R^1-Si(NH)_{3/2}$ wherein $Rf$ denotes a perfluoroalkyl group having 1 to 10 carbon atoms and $R^1$ denotes a divalent hydrocarbon group having 2 to 10 carbon atoms.

7 Claims, 8 Drawing Sheets

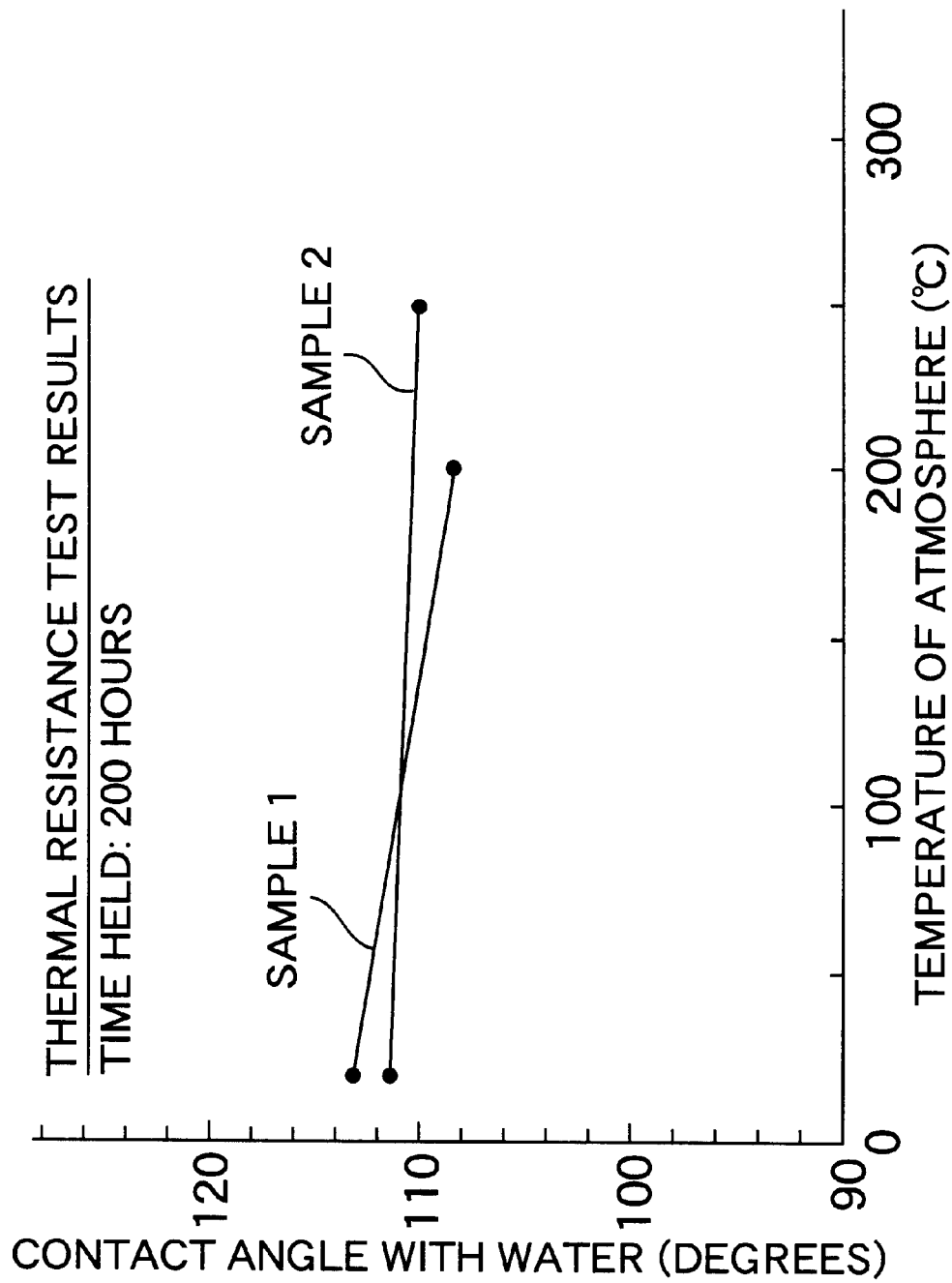

COMBUSTION CHAMBER COMPONENT FOR AN INTERNAL COMBUSTION ENGINE HAVING A WATER AND OIL REPELLENT COATING AND PROCESS FOR FORMATION OF COATING

FIELD OF THE INVENTION

The present invention relates to combustion chamber components for internal combustion engines having a water and oil repellent coating and a process for formation of the coating.

With regard to the aforementioned combustion chamber components, cylinder heads, pistons, the valve seat parts of fuel injection valves, etc. can be cited as examples. The reason for these parts to have a water and oil repellant coating is to suppress the accumulation of deposits on their surface due to the oxidation of adhered fuel by making the surfaces resistant to the adhesion of fuel.

With regard to pistons having a water and oil repellant coating, those disclosed in Japanese Patent Application Laid-open No. 8-105352 are known in the art, and with regard to valve seat parts for fuel injection valves having a water and oil repellant coating, those disclosed in Japanese Patent Application Laid-open No. 9-112392 are known.

However, since conventional water and oil repellent coatings are poor in terms of their thermal durability in the thermal environment of the combustion chamber, the effect of suppressing the accumulation of deposits is not well maintained and, in addition, adhesion to the combustion chamber components is inadequate, which is a problem.

SUMMARY OF THE INVENTION

An objective of the present invention is to provide the aforementioned combustion chamber components having a water and oil repellent coating in which the effect of suppressing the accumulation of deposits is well maintained and which has good adhesive power.

In order to achieve the aforementioned objective in accordance with the present invention, a combustion chamber component for an internal combustion engine having a water and oil repellent coating is provided which has a water and oil repellent coating on its surface, the coating being formed from an organosilicon compound represented by the formula Rf—$R^1$—$Si(NH)_{3/2}$ wherein Rf denotes a perfluoroalkyl group having 1 to 10 carbon atoms and $R^1$ denotes a divalent hydrocarbon group having 2 to 10 carbon atoms.

The combustion chamber components are formed from, for example, at least one type of material chosen from steel, cast iron, malleable Al alloy and Al casting alloy. Since it is possible to cause chemical bonding between the surface of the combustion chamber components and the organosilicon compound of the invention, the coating of the invention exhibits excellent adhesive power. Furthermore, the coating of the invention has good water and oil repellent properties as well as good thermal durability in the thermal environment of the combustion chamber, thus maintaining the effect of suppressing the accumulation of deposits over long periods.

In the aforementioned general formula Rf corresponds to $CF_3$—, $C_4F_9$—, $C_8F_{17}$—, etc. which may have straight or branched chains. With regard to $R^1$, it corresponds, for example, to an alkylene group such as —$C_2H_4$— or —$C_3H_6$— in which the two terminal carbons are joined by single bonds, etc.

Another objective of the present invention is a process in which a water and oil repellent coating can be formed efficiently.

In order to achieve the objective in accordance with the present invention, a process for the formation of a water and oil repellent coating is provided which comprises the following steps:

(1) cleansing the surface of a combustion chamber component for an internal combustion engine using at least one of a washing material and an organic solvent, (2) maintaining the combustion chamber component at a temperature in the range from 100° C. to 500° C. for about 1 minute or more, and thereafter cooling the combustion chamber component to 50° C. or less and (3) forming a coating on the surface of the combustion chamber component from an organosilicon compound represented by the formula Rf—$R^1$—$Si(NH)_{3/2}$ wherein Rf denotes a perfluoroalkyl group having 1 to 10 carbon atoms and $R^1$ denotes a divalent hydrocarbon group having 2 to 10 carbon atoms.

By carrying out steps (1) and (2), various types of substances such as organic compounds attached to the surface of the combustion chamber component are removed and, furthermore, OH groups are generated on the surface of the combustion chamber component, thus increasing the OH density.

In step (3), the OH groups which are present on the surface of the combustion chamber component at a high density react directly with the organosilicon compound, and thus a coating is formed on the surface of the combustion chamber component which adheres to the surface via chemical bonding. It is possible to enhance the operability by employing an immersion method for the formation of such a coating.

Thus, in accordance with the process of the invention, a water and oil repellent coating can be formed efficiently in a small number of steps.

Since the coating formed by the present process is extremely thin (preferably 10 nm or less), even with the formation of a coating on the combustion chamber components the fit and functioning of, for example, fuel injection valves (e.g., the slidability of operating rods, the ability to seat valve bodies, etc.) is not degraded. Therefore, it becomes unnecessary to mask those parts for which the fit is important during the coating formation, and thus it is effective in terms of increasing the efficiency of the coating.

With regard to the washing materials in process step (1), it does not matter which type of washing material is used as long as the surfaces of the aforementioned parts can be cleansed, but it is preferable to use a detergent, which provides for enhancement of thermal durability and solvent resistance of the coating. With regard to the organic solvents, those which have a strong power to dissolve and are volatile including, for example, alcohols such as methanol and ethanol, ketones such as acetone and methyl ethyl ketone, and hydrocarbon-containing solvents such as toluene, xylene and hexane, etc. can be employed.

In process step (2), when the heating temperature is less than 100° C., the residual washing material and/or organic solvent from the preceding step cannot be completely removed and, furthermore, organic substances which could not be removed in the preceding step cannot be thermally decomposed. On the other hand, when the heating temperature exceeds 500° C., there is a possibility of damaging the physical properties of the materials which are required for the aforementioned parts and causing deformation of their shape. The reason for setting the minimum value for the heating time at about 1 minute or more is that at least approximately 1 minute is required to remove moisture. It is preferable for the heating time to be at least 1 hour. If the temperature to which the aforementioned components are cooled exceeds 50° C., when the aforementioned components are subjected to a treatment at room temperature (about 20° C., the same applies below) with a solution of an organosilicon compound in accordance with the invention, the solution is converted into a foam, which makes it very difficult to form a uniform coating.

An alternative embodiment of the present invention includes a process for the formation of a water and oil repellent coating in which the heating and cooling of the aforementioned step (2) are omitted. This is a simplified process, but the efficiency of formation of the coating is high.

Another embodiment in accordance with the present invention includes a process for the formation of a water and oil repellent coating in which in the aforementioned step (2), the surfaces of the aforementioned parts are pickled instead of employing the aforementioned heating and cooling step.

This pickling step is carried out using an acid, in order to remove the organic substances remaining on the surface of the aforementioned parts and roughen the surface so as to increase the density of the OH groups. With regard to the acid to be used in the pickling step, there are no particular restrictions. Hydrochloric acid, sulphuric acid, nitric acid, phosphoric acid, acetic acid, etc. can be cited as examples. There are no restrictions on the concentration of these acids either, but it is preferable to use them at a concentration of from 0.01 to 5 mol/l.

A further embodiment in accordance with the present invention includes a process for the formation of a water and oil repellent coating in which the coating obtained by carrying out each of the aforementioned steps is thereafter subjected to a calcination treatment under conditions in which the heating temperature is at least 100° C. and the heating time is at least 1 minute.

By this calcination treatment, the chemical bonding between the surface of the aforementioned components and the coating of the invention can be further strengthened. When the heating temperature is less than 100° C., it is insufficient for obtaining the advantageous effect. This also applies to the case where the heating time is less than 1 minute. When considering the thermal stability of the organosilicon compound which forms the coating, it is preferable for the heating temperature in this calcining step to be 300° C. or less.

BRIEF DESCRIPTION OF THE DRAWINGS

FIG. 8 is a graph showing another example of the thermal resistance test results.

DESCRIPTION OF THE PREFERRED EMBODIMENTS

Figure 1:
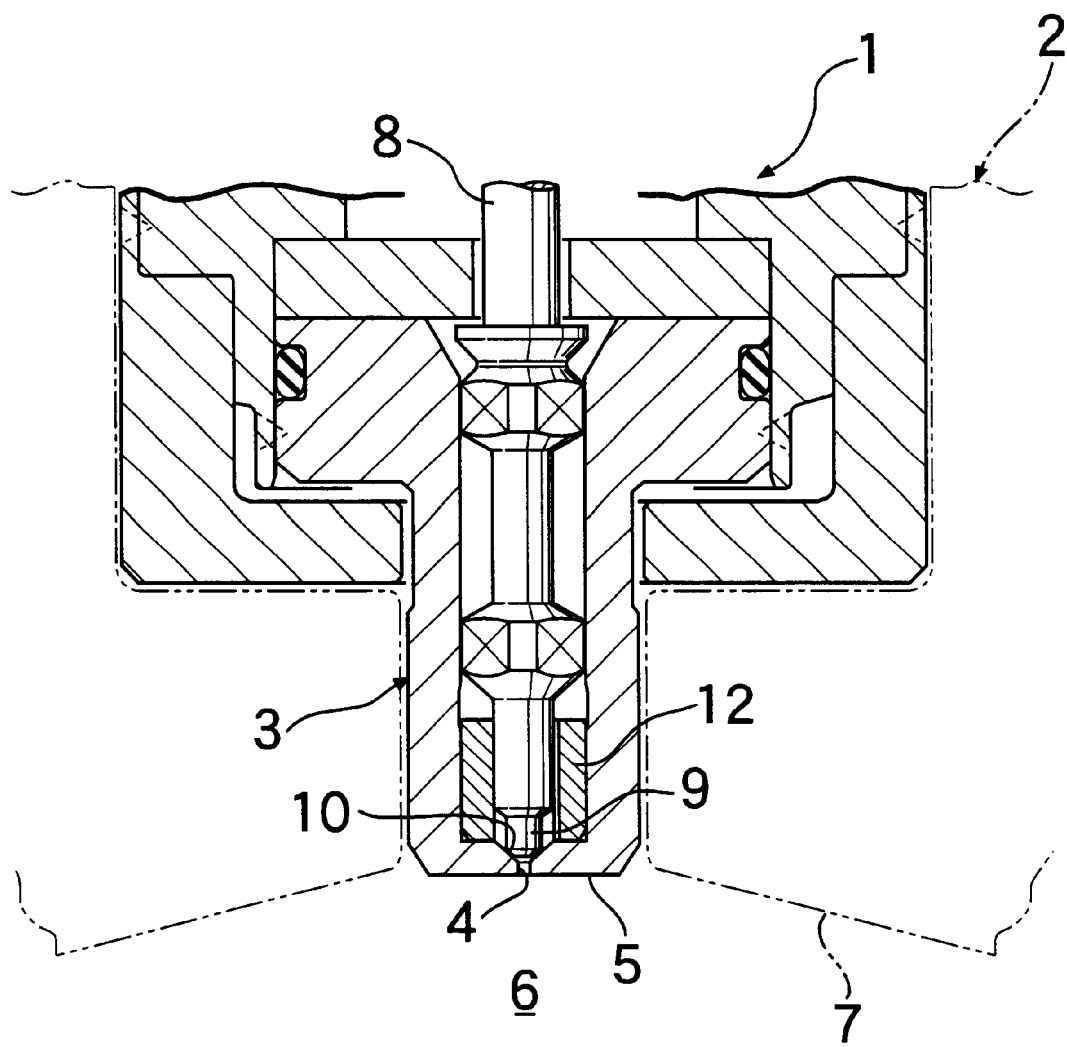
FIG. 1 is a cross-sectional view of the essential parts of a fuel injection valve.

In FIG. 1, electromagnetic system fuel injection valve 1 is installed in cylinder head 2 of an internal combustion engine. In valve seat part 3 of fuel injection valve 1, the end surface 5 through which injection hole 4 opens forms part of inner wall surface 7 of combustion chamber 6 and thus valve seat part 3 functions as a combustion chamber component. Operating rod 8 is supported inside valve seat part 3 in a slidable manner, and valve body 9 which is present at the end of operating rod 8 faces valve seat 10 which is formed around the inner end of injection hole 4. There is a gap between that portion of operating rod 8 around the valve body 9 and guide 12 which supports that portion, which gap is of a size such that fuel can flow.

Valve seat part 3 is preferably made from martensitic 14Cr stainless steel. When fuel adheres to the rim of injection hole 4 on its end surface 5, the inner surface of injection hole 4 and valve seat 10 and the adhered fuel is oxidised so that deposits accumulate, and the flow rate of the fuel decreases. Therefore, end surface 5 of valve seat part 3, the inner surface of injection hole 4 and valve seat 10 are those surfaces on which a water and oil repellent coating is preferably formed.

As a model for valve seat part 3, multiple small discs having a diameter of 12.0 mm and a thickness of 2.0 mm were prepared from martensitic 14Cr stainless steel. A metaxylene hexafluoride solution of an organosilicon compound represented by the chemical formula $C_8F_{17}$—$C_2H_4$—$Si(NH)_{3/2}$ (the solution had a concentration of the organosilicon compound of 3%) was prepared.

Water and oil repellent coatings were formed by the various processes described below using the aforementioned small discs and the organosilicon compound solution in accordance with the invention, and the properties of the coatings were examined.

EXAMPLE 1

Step (1): A small disc was washed using a detergent (Lipon F; made by Lion Corp.), and in order to rinse the small disc, it was maintained in a stream of tap water for about 5 sec. and subsequently in a stream of distilled water for about 5 sec. The small disc was then subjected to ultrasonic cleaning while immersing it in acetone for about 5 minutes.

Step (2): The small disc was maintained at a temperature of 200° C. for 10 hours and then cooled to room temperature.

Step (3): The small disc was immersed in the organosilicon compound solution described above at room temperature for about 5 minutes, the excess thereof was removed by blowing air onto the small disc, and the uncured coating was then dried at room temperature for about 1 minute.

Step (4): The uncured coating was subjected to a calcination treatment under conditions in which the heating temperature was 100° C. and the heating time was 10 minutes.

Test piece TP1a possessing a water and oil repellent coating having a thickness of about 5 nm was thus obtained. The coat thickness was almost the same for each of the test pieces below. Test pieces TP1b and TP1c were also obtained by repeating steps (1) to (4) in the same manner as described above.

In order to test the durability of these test pieces TP1a to TP1c, the contact angle between the aforementioned coatings and water was measured at room temperature. Test pieces TP1a to TP1c were then held in an atmosphere heated at 300° C. for fixed times, and the contact angle with water was then measured at room temperature in the same manner as described above. The results are given in Table 1.

TABLE 1

| Time held (h) | Contact angle with water (degrees) | | |
|---|---|---|---|
| | TP1a | TP1b | TP1c |
| 0 | 111.3 | 111.0 | 115.7 |
| 203 | 115.1 | 120.4 | 113.3 |
| 340 | 114.9 | 120.3 | 115.9 |
| 500 | 118.0 | 114.4 | 117.3 |

Figure 2:
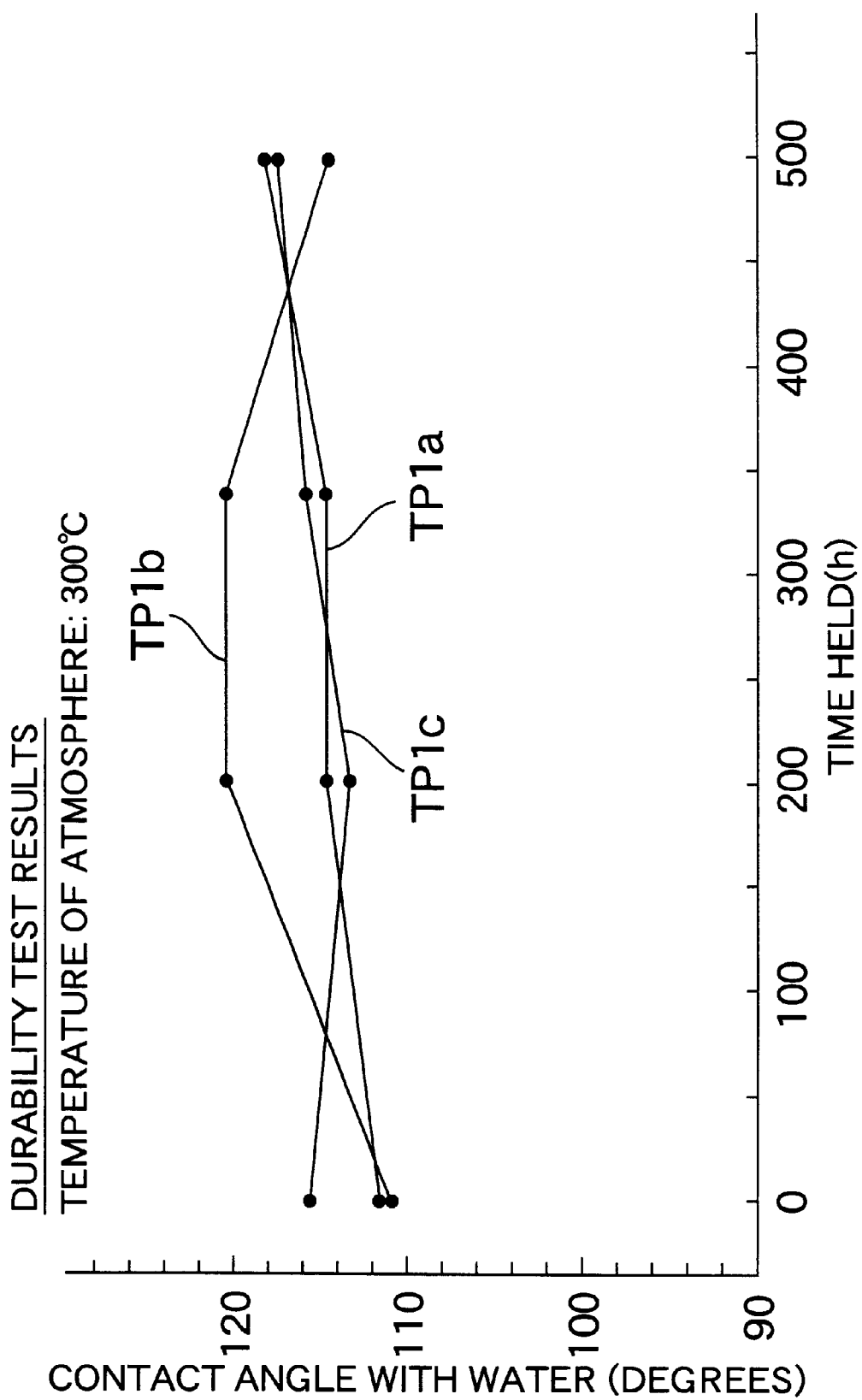
FIG. 2 is a graph showing one example of the durability test results.

In this case, if the contact angle with water was 100 degrees or above the water and oil repellent properties were judged to be good. This criterion was also applied to each of the embodiments below. FIG. 2 is a graph based on Table 1. As is clear from FIG. 2, the change in contact angle during the durability test for each of the coatings of test pieces TP1a to TP1c is comparatively small, which suggests that each of these coatings has excellent thermal durability.

EXAMPLE 2

Test piece TP1d was obtained by carrying out steps (1) to (4) of Example 1. Test piece TP2 was obtained by carrying out steps (1) to (3) of Example 1, then drying the coating at room temperature for 24 hours without the calcination treatment.

In order to test the organic solvent resistance of test pieces TP1d and TP2, the contact angle between the aforementioned coatings and water was measured at room temperature, test pieces TP1d and TP2 were both subjected to ultrasonic cleaning while they were immersed in an organic solvent (Clenzol; made by Nippon Oil Co., Ltd.) for 6 hours, and the contact angle was then measured at room temperature in the same manner as described In Example 1. The results are given in Table 2.

TABLE 2

| | Contact angle with water (degrees) | |
|---|---|---|
| | TP1d | TP2 |
| Before test | 109.3 | 107.1 |
| After test | 102.0 | 93.0 |

Figure 3:
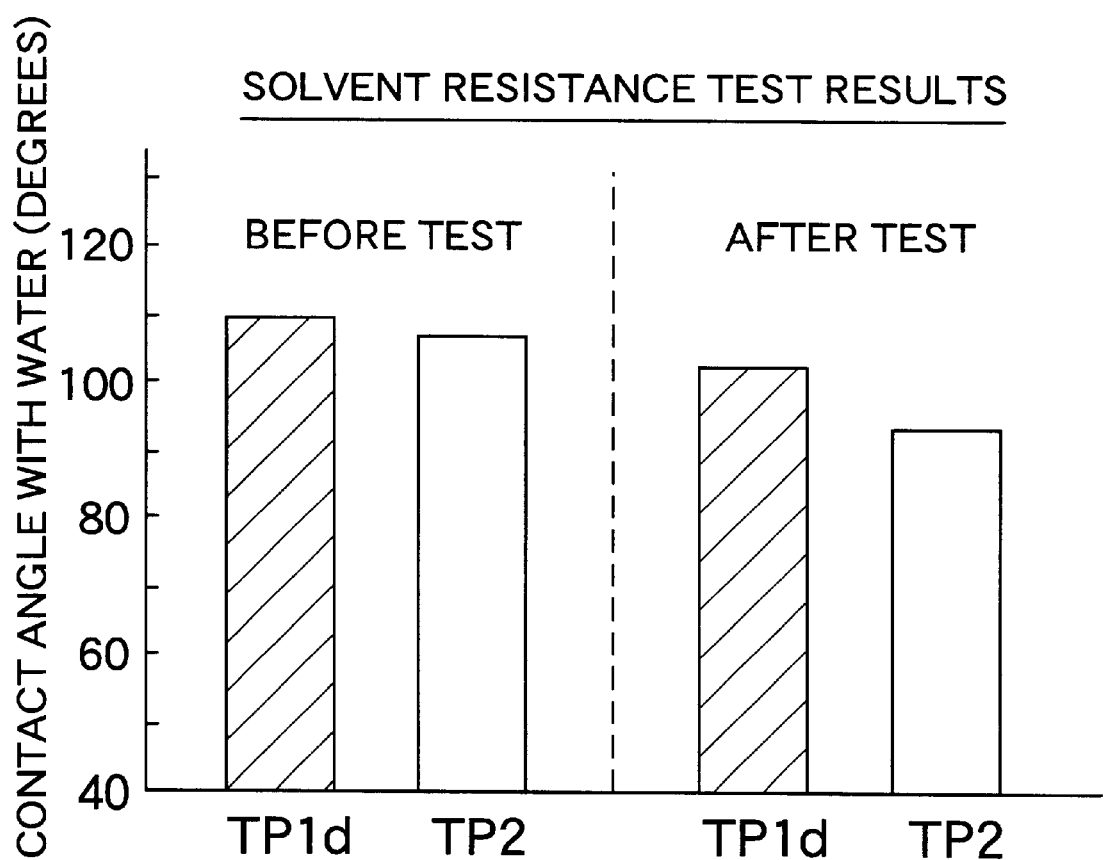
FIG. 3 is a graph showing the solvent resistance test results.

FIG. 3 is a graph based on Table 2. As is clear from FIG. 3, by carrying out the calcination treatment after formation of the coating as in TP1d, the organic solvent resistance of the coating was improved in comparison with TP2 which was not subjected to the treatment.

EXAMPLE 3

1. Test piece TP1e was obtained by carrying out steps (1) to (4) of Example

2. Test piece TP3 was obtained by carrying out each of the steps below.

Step (1): A small disc was subjected to ultrasonic cleaning while immersing it in acetone for about 5 minutes.

Step (2): The small disc was immersed in the organosilicon compound solution of the invention at room temperature for about 5 minutes, the excess thereof was removed by blowing air onto the small disc, and the uncured coating was then dried at room temperature for about 1 minute.

Step (3): The uncured coating was subjected to a calcination treatment under conditions in which the heating temperature was 100° C. and the heating time was 10 minutes.

3. Test piece TP4 was obtained by carrying out each of the steps below.

Step (1): The surface of a small disc was wiped with acetone.

Step (2): The small disc was maintained at a temperature of 200° C. for 10 hours and then cooled to room temperature.

Step (3): The small disc was immersed in the organosilicon compound solution of the invention at room temperature for about 5 minutes, the excess thereof was removed by blowing air onto the small disc, and the uncured coating was then dried at room temperature for about 1 minute.

Step (4): The uncured coating was subjected to a calcination treatment under conditions in which the heating temperature was 100° C. and the heating time was 10 minutes.

4. Test piece TP5 was obtained by carrying out each of the steps below.

Step (1): A small disc was washed with a detergent (Lipon F; made by Lion Corp.), and in order to rinse the small disc it was maintained in a stream of tap water for about 5 sec. and subsequently in a stream of distilled water for about 5 sec. The small disc was then dried by blowing air onto it.

Step (2): The small disc was immersed in the organosilicon compound solution of the invention at room temperature for about 5 minutes, the excess thereof was removed by blowing air onto the small disc and the uncured coating was then dried at room temperature for about 1 minute.

Step (3): The uncured coating was subjected to a calcination treatment under conditions in which the heating temperature was 100° C. and the heating time was 10 minutes.

In order to test the thermal resistance of test pieces TP1e and TP3 to TP5, the contact angle between the aforementioned coatings and water was measured at room temperature, test pieces TP1e, TP3 to TP5 were then held in an atmosphere heated at a set temperature for 200 hours, and the contact angle with water was then measured in the same manner as described above. The results are given in Table 3.

TABLE 3

| Temperature of atmosphere (° C.) | Contact angle with water (degrees) | | | |
|---|---|---|---|---|
| | TP1e | TP3 | TP4 | TP5 |
| 20 | 116.5 | 104.9 | 100.4 | 104.7 |
| 150 | 114.0 | 105.5 | 101.0 | 106.0 |
| 200 | 113.5 | 104.7 | 102.7 | 105.9 |
| 250 | 115.0 | 105.3 | 100.0 | 104.0 |
| 300 | 116.3 | — | — | — |

Figure 4:
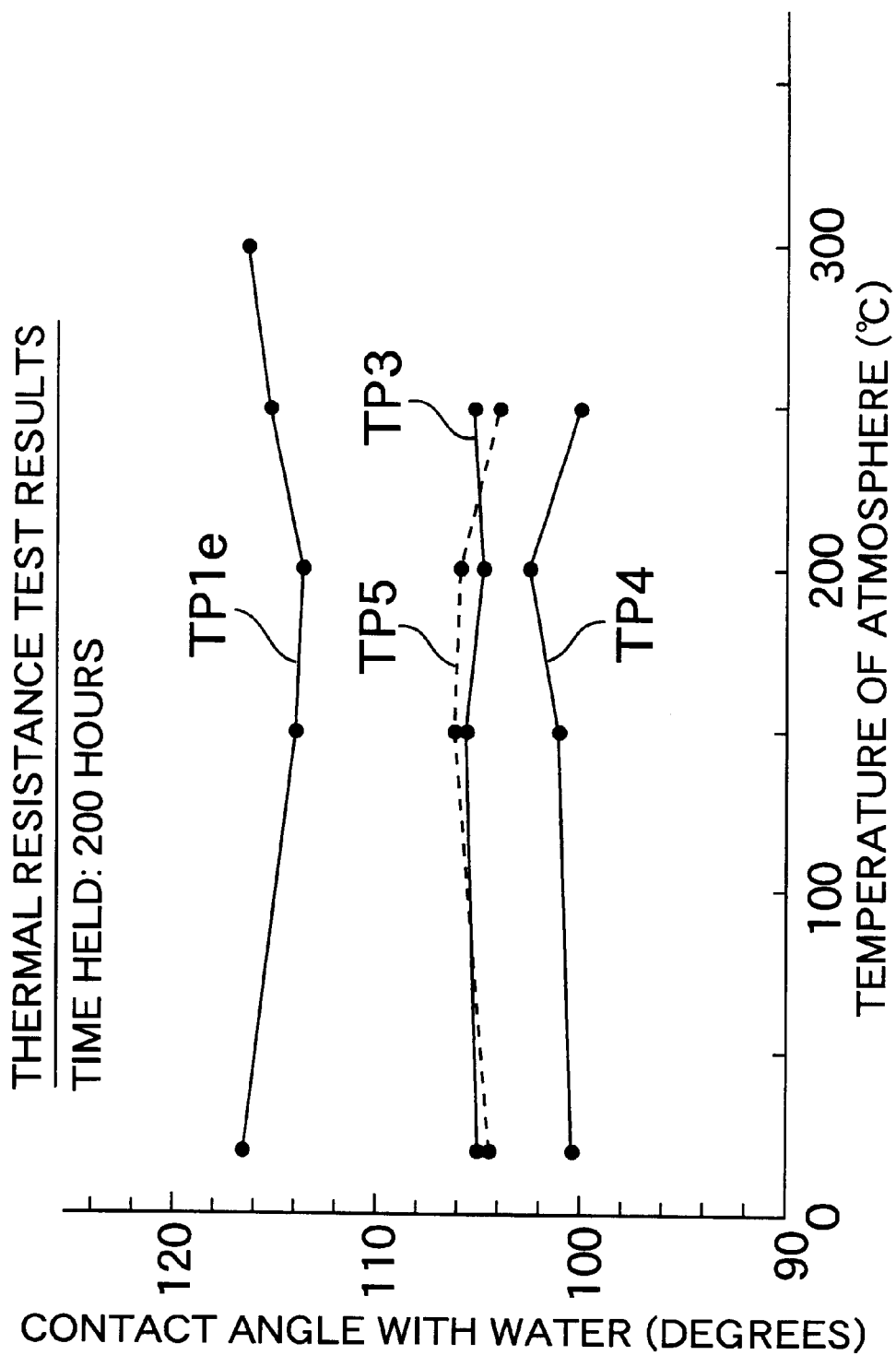
FIG. 4 is a graph showing one example of the thermal resistance test results.

FIG. 4 is a graph based on Table 3. As is clear from FIG. 4, the change in contact angle during the thermal resistance test for the coatings of each of the test pieces TP1e and TP3 to TP5 is comparatively small, which suggests that each of these coatings has excellent thermal durability.

When comparing the results of the thermal durability test of the coatings of test pieces TP1e and TP3 to TP5, test piece TP1e was the best, second were test pieces TP3 and TP5 which gave almost the same level, and test piece TP4 followed test pieces TP3 and TP5. It can be said from the results above that in order to improve the thermal durability of the coatings thoroughly cleansing the small disc, that is to say valve seat part 3, using a detergent and carrying out a step in which the residual adhered organic compounds are thermally decomposed is effective.

EXAMPLE 4

Step (1): A small disc was washed with a detergent (Lipon F; made by Lion Corp.), the small disc was then subjected to ultrasonic cleaning while immersing it in acetone for about 5 minutes and subsequently the small disc was washed using trichloroethylene.

Step (2): The small disc was pickled by immersing it in a 2.5 mol/l hydrochloric acid solution at room temperature for about 2 sec., the small disc was then rinsed using distilled water three times, then subsequently immersed in ethanol so as to remove the water, and the ethanol was then removed by allowing it to stand at room temperature (and/or blowing nitrogen gas onto it).

Step (3): The small disc was immersed in the organosilicon compound solution of the invention at room temperature for about 5 minutes, the excess thereof was removed by blowing air onto the small disc and the uncured coating was then dried at room temperature for about 1 minute.

Step (4): The uncured coating was subjected to a calcination treatment under conditions in which the heating temperature was 100° C. and the heating time was 10 minutes.

Test piece TP6a possessing a water and oil repellent coating was thus obtained. Test piece TP6b was also obtained by carrying out steps (1) to (4) in the same manner as mentioned above.

In order to test the durability of these test pieces TP6a and TP6b, the contact angle between the aforementioned coatings and water was measured at room temperature, test pieces TP6a and TP6b were then held in an atmosphere heated at 250° C. for 200 hours and the contact angle with water was measured at room temperature in the same manner as mentioned above. The results are given in Table 4.

TABLE 4

| Time held | Contact angle with water (degrees) | |
| --- | --- | --- |
| (h) | TP6a | TP6b |
| 0 | 109.0 | 108.0 |
| 200 | 106.5 | 105.0 |

Figure 5:
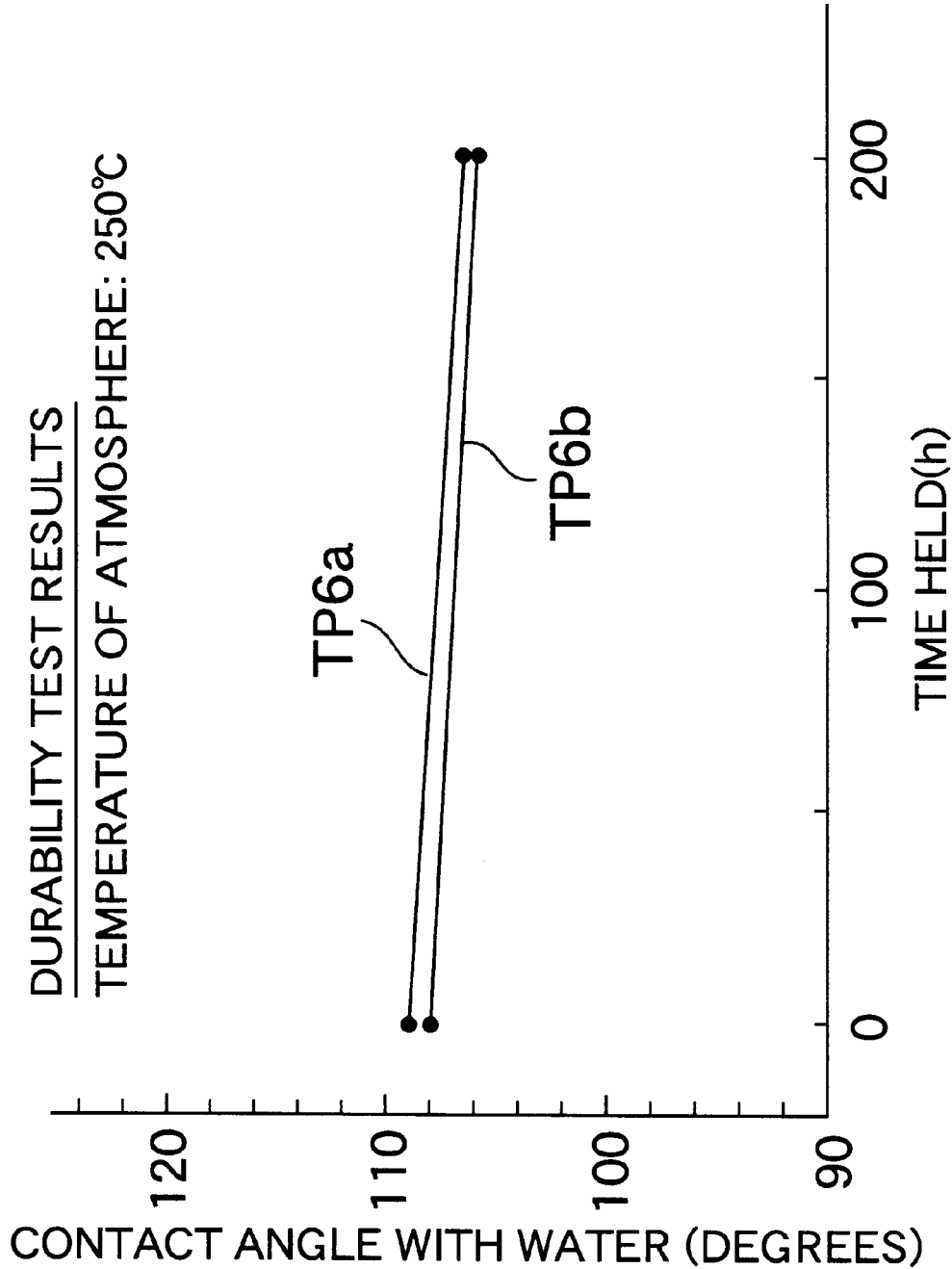
FIG. 5 is a graph showing another example of the durability test results.

FIG. 5 is a graph based on Table 4. As is clear from FIG. 5, the change in contact angle during the durability test for each of the coatings of test pieces TP6a and TP6b was comparatively small, which suggests that each of these coatings has excellent thermal durability.

Figure 6:
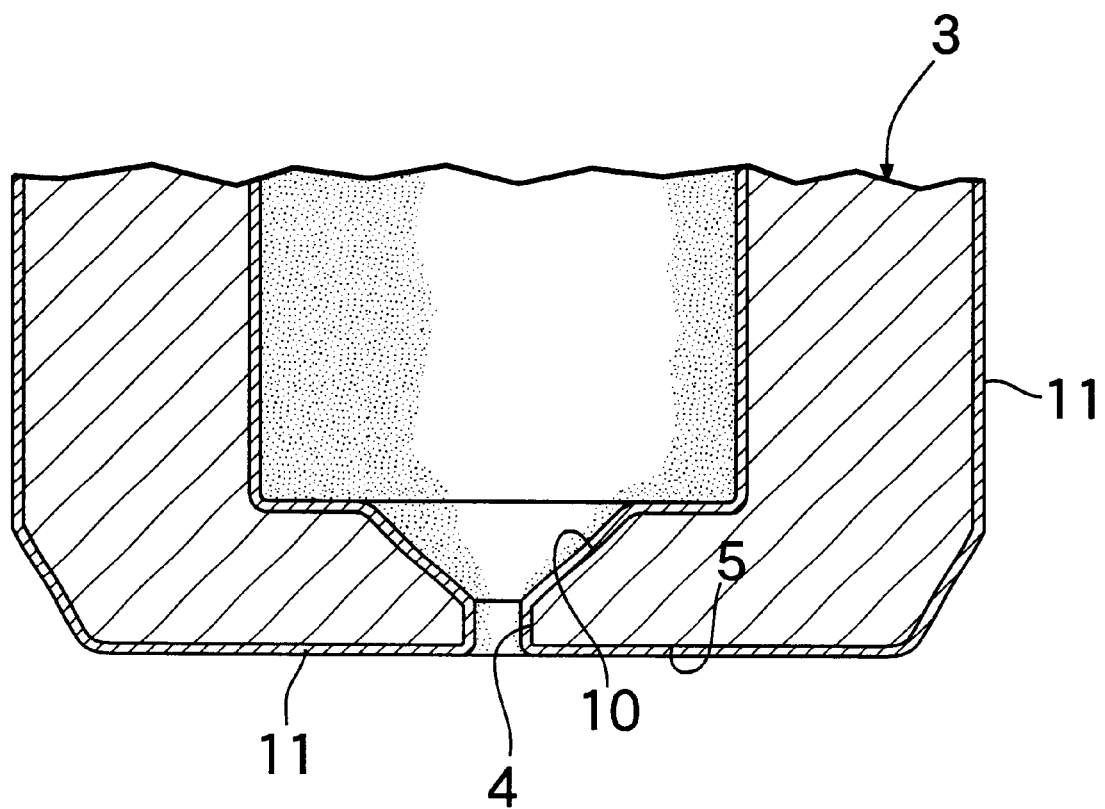
FIG. 6 is a magnified cross-sectional view of the essential parts of the valve seat parts.

As shown in FIG. 6, water and oil repellent coating 11 was formed over the entire surface of valve seat part 3 of fuel injection valve 1 shown in FIG. 1 by employing the process of Example 1. Fuel injection valve 1 equipped with such a valve seat part 3 and fuel injection valve 1 equipped with valve seat part 3 not having the aforementioned water and oil repellent coating were incorporated into a 4 cycle internal combustion engine, subjected to a bench test with 800 operating cycles corresponding to 10–15 modes and the percentage reduction in the flow rate of fuel in the two fuel injection valves 1 was measured. The results are given in FIG. 7.

Figure 7:
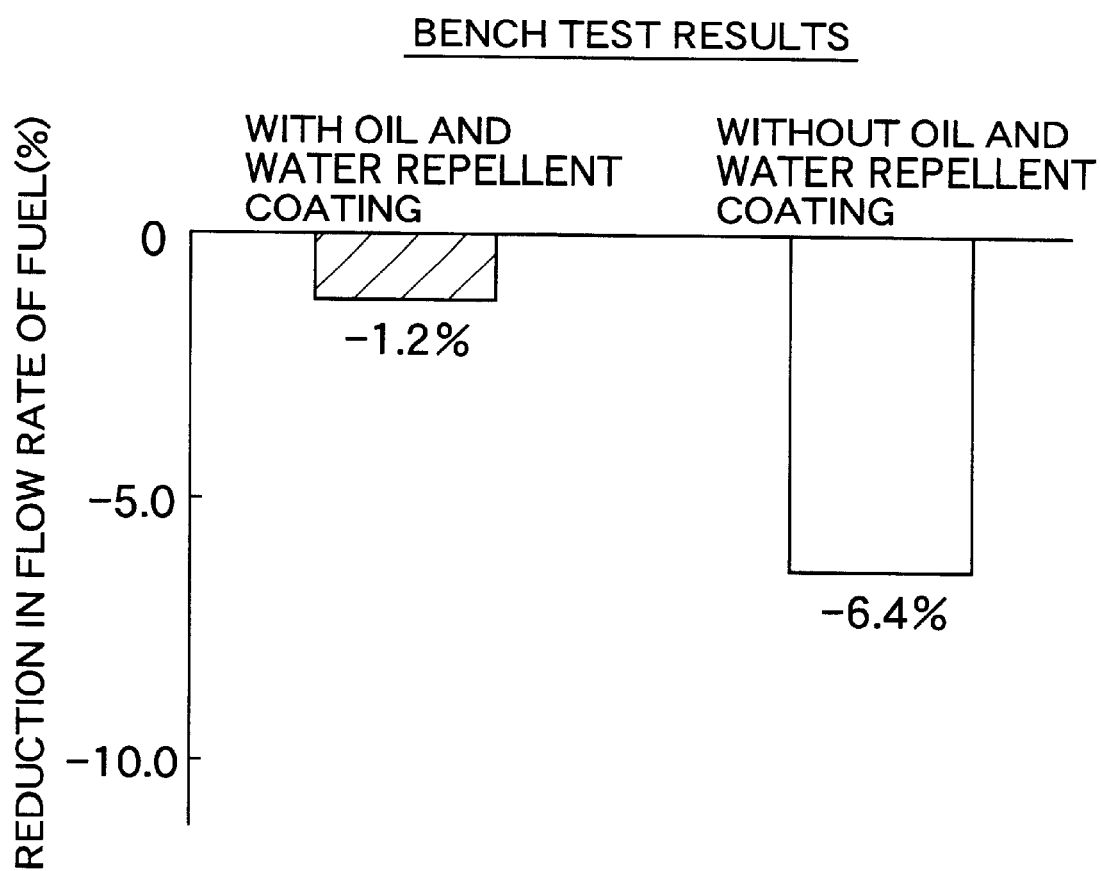
FIG. 7 is a graph showing the bench test results.

As is clear from FIG. 7, in the case of valve seat part 3 having the aforementioned coating 11, since the accumulation of deposits at its injection hole 4, etc. was greatly suppressed, the percentage reduction in flow rate of the fuel was extremely small, but in the case of valve seat part 3 not having the aforementioned coating 11, since deposits accumulated at its injection hole 4, etc., the percentage reduction in flow rate of the fuel was large, and it was found that its level was at least 5 times of that of the case where aforementioned coating 11 was present.

Furthermore, since the thickness of the aforementioned coating 11 is extremely thin at about 5 nm, the coating 11 does not interfere with the fit of valve seat part 3, the slidability of operating rod 8, the ability to seat valve body 9, etc.

As a combustion chamber component, a piston was cast using an Al casting alloy (JIS AC8B-T7), and a coating was formed thereon using the piston and the aforementioned organosilicon compound solution by the process below.

Step (1): The piston was washed with a detergent (Lipon F; made by Lion Corp.), and in order to rinse the piston, it was maintained in a stream of tap water for about 5 sec. and subsequently in a stream of distilled water for about 5 sec. The piston was then subjected to ultrasonic cleaning while immersing it in acetone for about 5 minutes.

Step (2): The piston was maintained at 200° C. for 10 hours and then cooled to room temperature.

Step (3): The piston was immersed in the organosilicon compound solution of the invention at room temperature for about 5 minutes, the excess thereof was removed by blowing air onto the piston and the uncured coating was then dried at room temperature for about 1 minute.

Step (4): The uncured coating was subjected to a calcination treatment under conditions in which the heating temperature was 100° C. and the heating time was 10 minutes.

By so doing, Piston Sample 1 having a water and oil repellent coating was obtained. Furthermore, Piston Sample 2 was obtained by carrying out steps (1) to (4) in the same manner as mentioned above.

In order to test the thermal resistance of these samples 1 and 2, the contact angle between the aforementioned coatings and water was measured at room temperature, then samples 1 and 2 were held in an atmosphere heated at set temperature, for 200 hours, and the contact angle with water was measured at room temperature in the same manner as described above. The results are given in Table 5.

TABLE 5

| Temperature of atmosphere (° C.) | Contact angle with water (degrees) | |
| --- | --- | --- |
| | Sample 1 | Sample 2 |
| 20 | 113.1 | 111.3 |
| 200 | 108.4 | — |
| 250 | — | 110.0 |

FIG. 8 is a graph based on Table 5. As is clear from FIG. 8, the change in contact angle during the thermal resistance test for each of the coatings of samples 1 and 2 was comparatively small, which suggests that each of these coatings has excellent thermal durability.

The present invention can, of course, be applied to cylinder heads and other combustion chamber components.

In accordance with the present invention having the aforementioned arrangement, combustion chamber components for an internal combustion engine having a water and oil repellent coating which has good adhesive power and in which the effect of suppressing the accumulation of deposits is well maintained are provided.

Furthermore, in accordance with the present invention, a formation process in which the aforementioned water and oil repellent coating can be formed efficiently is provided.

We claim:

1. A combustion chamber component for an internal combustion engine having a water and oil repellent coating on at least one surface thereof, wherein said coating is formed from an organosilicon compound represented by the formula Rf—$R^1$—Si(NH)$_{3/2}$ wherein Rf denotes a perfluoroalkyl group having 1 to 10 carbon atoms and $R^1$ denotes a divalent hydrocarbon group having 2 to 10 carbon atoms.

2. The combustion chamber component according to claim 1 wherein said combustion chamber component is formed from at least one material selected from the group consisting of steel, cast iron and Al alloy.

3. The combustion chamber component according to claim 1 wherein said combustion chamber component is a valve seat part of a fuel injection valve, and said at least one surface is an end surface of said valve seat part through which an injection hole opens, an inner circumferential surface of said injection hole and said valve seat.

4. A process for the formation of a water and oil repellent coating on a surface of a combustion chamber component, the process comprising (1) cleansing the surface of a combustion chamber component for an internal combustion engine using at least one of a washing material and an organic solvent, (2) maintaining said combustion chamber component at a temperature in the range from 100° C. to 500° C. for at least 1 minute and thereafter cooling said combustion chamber component to 50° C. or less and (3) thereafter forming a coating on said surface from an organosilicon compound represented by the formula Rf—$R^1$—Si(NH)$_{3/2}$ wherein Rf denotes a perfluoroalkyl group having 1 to 10 carbon atoms and $R^1$ denotes a divalent hydrocarbon group having 2 to 10 carbon atoms.

5. A process for the formation of a water and oil repellent coating on a surface of a combustion chamber component, the process comprising (1) cleansing the surface of a combustion chamber component for an internal combustion engine using at least one of a washing material and an organic solvent and (2) forming a coating on said surface from an organosilicon compound represented by the formula Rf—$R^1$—Si(NH)$_{3/2}$ wherein Rf denotes a perfluoroalkyl group having 1 to 10 carbon atoms and $R^1$ denotes a divalent hydrocarbon group having 2 to 10 carbon atoms.

6. A process for the formation of a water and oil repellent coating on a surface of a combustion chamber component, the process comprising (1) cleansing the surface of a combustion chamber component for an internal combustion engine using at least one of a washing material and an organic solvent, (2) pickling said surface and (3) forming a coating on said surface from an organosilicon compound represented by the formula Rf—$R^1$—Si(NH)$_{3/2}$ wherein Rf denotes a perfluoroalkyl group having 1 to 10 carbon atoms and $R^1$ denotes a divalent hydrocarbon group having 2 to 10 carbon atoms.

7. The process according to any one of claims 4, 5 or 6 further comprising thereafter subjecting said coating to a calcination treatment under conditions in which the heating temperature is at least 100° C. and the heating time is at least 1 minute.

* * * * *